United States Patent
Drake et al.

(10) Patent No.: US 8,815,008 B2
(45) Date of Patent: Aug. 26, 2014

(54) STARCH-BASED ABRASIVE ABSORBENT

(75) Inventors: Cameron Drake, Knoxville, TN (US); Webb K. Kane, St. Louis, MO (US); George Koutlakis, Greenfield Park (CA); John Hugh Rogers, St. Louis, MO (US)

(73) Assignee: Archer Daniels Midland Company, Decatur, IL (US)

( * ) Notice: Subject to any disclaimer, the term of this patent is extended or adjusted under 35 U.S.C. 154(b) by 969 days.

(21) Appl. No.: 10/862,083

(22) Filed: Jun. 4, 2004

(65) Prior Publication Data

US 2004/0244652 A1    Dec. 9, 2004

Related U.S. Application Data

(60) Provisional application No. 60/475,494, filed on Jun. 4, 2003.

(51) Int. Cl.
*C04B 28/00* (2006.01)
*C04B 28/02* (2006.01)
*C04B 111/00* (2006.01)

(52) U.S. Cl.
CPC ....... *C04B 28/02* (2013.01); *C04B 2111/00784* (2013.01)
USPC .......................... 106/697; 106/805

(58) Field of Classification Search
None
See application file for complete search history.

(56) References Cited

U.S. PATENT DOCUMENTS

| | | | |
|---|---|---|---|
| 3,706,598 A | 12/1972 | Carrell | |
| 4,537,877 A | 8/1985 | Ericsson | |
| 4,770,715 A * | 9/1988 | Mandel et al. | 134/40 |
| 4,962,172 A * | 10/1990 | Allen et al. | 526/318.42 |
| 5,066,335 A | 11/1991 | Lane et al. | |
| 5,256,703 A | 10/1993 | Hermann et al. | |
| 5,356,678 A * | 10/1994 | Heitzhaus et al. | 428/35.6 |
| 5,360,903 A | 11/1994 | Lane et al. | |
| 5,367,068 A | 11/1994 | Lane et al. | |
| 5,509,971 A * | 4/1996 | Kirschner | 134/7 |
| 5,679,364 A * | 10/1997 | Levy | 424/405 |
| 5,886,124 A * | 3/1999 | Kightlinger et al. | 527/312 |
| 5,958,589 A * | 9/1999 | Glenn et al. | 428/402.2 |
| 5,970,993 A * | 10/1999 | Witherspoon et al. | 134/1.1 |
| 6,098,569 A * | 8/2000 | Kent et al. | 119/171 |
| 6,159,257 A | 12/2000 | Koutlakis et al. | |
| 6,197,951 B1 * | 3/2001 | Lenz | 536/123.1 |
| 6,217,945 B1 * | 4/2001 | Fowler | 427/410 |
| 6,444,653 B1 | 9/2002 | Huppe et al. | |
| 6,884,765 B2 * | 4/2005 | Bargaje | 510/285 |
| 2002/0156048 A1 | 10/2002 | Huppe et al. | |
| 2004/0109721 A1 * | 6/2004 | Nowak et al. | 401/227 |
| 2004/0157532 A1 | 8/2004 | Koutlakis et al. | |

FOREIGN PATENT DOCUMENTS

CA    02308537    * 11/2000

OTHER PUBLICATIONS

Frosch et al., Strategies for manufacturing., 1989, Scientific American, 189 (3) 152.*
Industry trade and techonolgy review, "researchers starch up soggy us polymer industry", Jan. 1998, p. 21.*
U.S. Appl. No. 60/439,791, Koutlakis et al.
Yamazaki, W.T., 1953. An alkaline water retention capacity test for the evaluation of cookie baking potentialities of soft winter wheat flours. Cereal Chem. 30:242-246.

* cited by examiner

*Primary Examiner* — Melvin C Mayes
*Assistant Examiner* — Stefanie Cohen
(74) *Attorney, Agent, or Firm* — Andrew F. Nilles

(57) ABSTRACT

A method of absorbing a liquid is disclosed. The method comprises mixing a recycled, starch-based absorbent having an average mesh size greater than 80 mesh with a liquid to form a composition. The invention also relates to compositions formed by mixing the recycled starch-based absorbent with a liquid. Lastly, a kit comprising the recycled absorbent is disclosed.

18 Claims, No Drawings

STARCH-BASED ABRASIVE ABSORBENT

CROSS REFERENCE TO RELATED APPLICATIONS

This application claims priority under 35 U.S.C. §119(e) to U.S. Provisional Patent Application No. 60/475,494, filed Jun. 4, 2003, which is incorporated herein by reference in its entirety.

BACKGROUND OF THE INVENTION

1. Field of Invention

The invention relates to a method of absorbing liquids and sludges. A particularly useful application of the invention relates to absorbing hazardous waste. The method comprises, inter alia, mixing a recycled, starch-based absorbent having an average mesh size greater than 80 mesh with a liquid product to form a composition. Compositions formed by mixing the recycled starch-based absorbent with a liquid waste product can also be included in the invention.

2. Description of the Related Art

Absorption of spilled liquids is a continuous problem for industries that encounter such spills in their normal course of business. This becomes a more acute problem for those industries producing and wishing to contain and/or dispose of hazardous liquid waste, whether or not they have been spilled.

For example, the airline industry is faced with frequent spills of jet fuel or other petroleum products, as well as harsh or potentially environment-damaging chemicals, e.g., cleansers, which are used in routine procedures. Essentially, any industry handling potentially harmful material is subject to legal, economic, and other consequences resulting from delayed, inadequate, or otherwise improper recovery of contaminated or hazardous spills. Potentially harmful products, whether they pose environmental hazards or health threats, are subject to spillage or leakage at any time during their transport or usage, requiring rapid and efficient removal, containment, and disposal in accordance with local, state, or federal laws or regulations. Nearly all manufacturing and transportation industries face similar problems.

A great variety of absorbent materials have been used to soak up liquids, such as flammable liquids, from the ground, from garage floors, roadways and the like. Commonly used absorbents for this purpose include both organic and inorganic materials. Useful organic absorbents include activated carbon, sawdust, wood pulp, paper, peanut hulls, shredded peat moss and similar cellulosic materials. Commonly used inorganic absorbents include clays, pumice, expanded micas, diatomaceous earth, fullers earth and many more. U.S. Pat. No. 4,537,877 summarizes a comprehensive description of solid absorbents, both organic and inorganic, which are used to soak up organic liquids and sets out potential advantages and disadvantages of the various materials.

Many absorbents are not advantageous in the use of spill recovery because of the large volume of absorbent needed to contain the spill. Additionally, the use of some absorbents results in the generation of a much larger volume of hazardous material because of the inability of the absorbent to contain the liquid spill.

Attending to the recovery of spills using inadequate absorbents is labor intensive, costly, and can require one or more workers who are specially trained in recovery of hazardous or contaminated material recovery to be available for rapid deployment. Therefore, there is a need in the art for a lowcost, highly efficient absorbent for the containment of hazardous waste.

Glass-like polysaccharides are well known in the art. These compositions are commonly formulated into abrasive grits for use as blast media in abrasive blasting operations, or fine particulates for use as absorbents in items such as diapers. Abrasive grits typically are hard, angular particles, as opposed to bead or shot, which have more rounded surfaces.

U.S. Pat. Nos. 5,066,335, 5,360,903, 5,367,068, and 6,197,951 describe glass-like polysaccharide abrasive grits and methods for using these grits as blast media to treat surfaces. U.S. Pat. No. 6,159,257 describes a glass-like polysaccharide abrasive grit that addresses a shortcoming of previously described grits, namely, water absorption. U.S. Pat. No. 6,444,653 and U.S. Patent Appl. Pub. No. 2002/0156048 A1, describe glass-like polysaccharide particulate that is useful as an absorbent for liquids. These glass-like polysaccharides are useful as absorbents because of their high capacity to absorb liquids and because they are a recycled product, represent a reusable, thereby cost-effective product to contain hazardous materials.

Therefore, the invention described herein provides for a low cost, highly efficient absorbent useful for absorption of liquids, especially hazardous liquid waste.

SUMMARY

The invention relates to a composition comprising a liquid and a recycled, starch-based absorbent, wherein the starch-based absorbent has an average size greater than 80 mesh prior to mixing with the liquid, and wherein the composition undergoes minimal weeping of the liquid from the absorbent. In one embodiment of the invention, the liquid is a hazardous waste product.

In one embodiment of the invention, the composition undergoes about 10% or less weeping of the liquid from the sludge composition.

In another embodiment of the invention, the final composition has a solid content between about 0% to about 10%, about 11% to about 20%, about 21% to about 30%, about 31% to about 40%, about 41% to about 50%, about 51% to about 60%, about 61% to about 70%, or about 71% to about 80%. In yet another embodiment, the final composition has a solid content between about 30% to about 60%.

In another embodiment of the invention, the recycled absorbent is produced from a starch-based material selected from the group consisting of wheat, corn, potato, tapioca, and rice. In yet another embodiment, the starch-based material is a copolymer.

In another embodiment of the invention, the starch-based absorbent is produced by propelling a starch-based blasting media against a solid surface.

In another embodiment of the invention, the composition may further comprise contaminating metals. These metals include: arsenic, selenium, zinc, copper, silver, nickel, titanium, lead, barium, chromium, beryllium, antimony, cadmium and mercury. The metals may be included in the starch-based absorbent, or in the liquid product.

In yet another embodiment of the invention, the composition further comprises a settable compound. The settable compound may, for example, be cement.

The invention is also directed to a method of absorbing a liquid comprising mixing a recycled starch-based absorbent having an average size greater than 80 mesh with a liquid to form a composition, wherein the mixing results in absorbing of the liquid such that minimal weeping occurs. In one embodiment, the method further comprises collecting the composition. In a further embodiment, the composition is collected into disposal containers.

In another embodiment of the invention, the liquid that is absorbed is a hazardous waste product.

In another embodiment of the invention, about 10% or less of the liquid weeps from the composition during absorption.

In another embodiment of the invention, the composition formed during absorption has a solid content between about 0% to about 10%, about 11% to about 20%, about 21% to about 30%, about 31% to about 40%, about 41% to about 50%, about 51% to about 60%, about 61% to about 70%, or about 71% to about 80%. In yet another embodiment, the composition formed during absorption has a solid content between about 30% to about 60%.

The invention is also directed to a kit for absorbing a liquid waste product comprising a recycled, starch-based absorbent and instructions concerning the absorbent's use as the recycled, starch-based absorbent. The kit may be in any size container. In one embodiment of the invention, the absorbent is packaged in containers which range in size from 500 kg to 55 gallon (200 lb.) drums. In another embodiment, the recycled, starch-based absorbent is packaged in a 500-kg container. In a further embodiment, the absorbent is packaged in 55-gallon drum.

DETAILED DESCRIPTION

The invention relates to, inter alia, a method of absorbing a liquid, and compositions resulting from said method. The method comprises mixing a recycled, starch-based absorbent having an average mesh size greater than 80 mesh with a liquid to form a composition.

DEFINITIONS

The term "absorbent" refers to water-insoluble or water-swellable polymers as hereinafter described having an enhanced capacity for removing liquids. The liquids may be spilled or generated through normal processes.

The term "hazardous waste" refers to a liquid waste, or mixture of liquid wastes which because of its quantity, concentration, or physical, chemical or infectious characteristics may: (1) cause or contribute to an increase in mortality, an increase in serious irreversible, or incapacitating reversible, illness; (2) pose a present or potential hazard to human health or the environment when improperly treated, stored, transported, or disposed of, or otherwise managed; or (3) have any type of deleterious effect on health or the environment. Typical hazardous substances are toxic, corrosive, ignitable, explosive, or chemically reactive. Some, but not all of these types of wastes are designated by United States Environmental Protection Agency to be reported if a designated quantity of the substance is spilled in the waters of the United States or if otherwise released into the environment.

The term "mixture of liquid wastes" refers to a combination of two or more chemical substances in liquid form.

The term "recycled starch-based absorbent" refers to a recycled starch-based media comprising a plurality of discrete granules greater than 80 mesh in average size that for example has been used in an application prior to being used as an absorbent. Such applications may include, but are not limited to abrasive-blasting an airplane, finishing metals in an agitator, or any type of application where the starch-based material is used as an abrasive or reduced in size to 80 mesh.

The term "agitator" refers to a mechanism that imparts motion to the substance being treated in order to modify its form or finish. For example, this can be a single motion of limited energy, or repetitive motions of high frequency and energy. The motion can occur over short or long durations of time.

The term "mesh" is a unit of particulate measurement that refers to the number of openings per square inch. For example, 80 mesh is equivalent to 177 microns, or 0.0070 inches.

The term "sludge" refers to a composition resulting from the mixture of a solid and liquid wherein most, if not all, of the liquid is absorbed by the solid. The resulting composition has physical characteristics of neither a solid nor a liquid.

The term "weeping" relates to the unintended leakage of the hazardous liquid from the absorbent material. Minimal weeping refers to between about 0-10% leakage of the liquid from the mixture. Weeping can be measured as a by-product of other analyses known in the art, for example, a slump test (Example 3). Using a slump test, weeping may be reported as the percent difference between the diameter of the sludge composition and the liquid that leached from the sludge during slump testing.

The term "contaminating metal" relates to metals and metallic compounds that are introduced into the starch-based absorbent during the recycling process.

The term "settable compound" refers to a liquid mixture that hardens upon settling and drying.

The term "disposal container" refers to any type of container useful in the collection of the sludge composition and removal from the location of the liquid. Disposal containers may be certified by the Department of Transportation.

"About" means plus or minus 5% of the value in question. Therefore, for example, "about 20%" means 19% to 21%.

"A," "an," "the," and the like, unless otherwise indicated, may include plural forms.

Recycled Starch-Based Absorbent

The recycled starch-based absorbent is produced using a starch-based abrasive as a starting material. The starch-based abrasive may be generated as described, inter alia, in U.S. Application No. 60/439,791.

Briefly, the starch-based abrasive is based on an amylaceous polysaccharide, such as amylose or amylopectin, or mixtures of the two. Accordingly, starch-based abrasives include, but are not limited to, those produced from starches such as corn, wheat, barley, rye, potato, tapioca, rice, milo, or other starches. In addition, the starch-based abrasives may be produced as copolymers of the above-mentioned starches. The length and branching of the polymer chains that are genetically predetermined and unique to any given unmodified starch, or which are the result of changes brought about in consequence of any modification of the starch, will have effects on the amount of, for example, hydrogen bonding and van der Waals forces (amongst others), which play a role in forming the above-mentioned glass-like polysaccharides. Thus, starches that have been hydrolytically modified to form glass-like materials are generally more brittle than are otherwise comparable glass-like materials based on unhydrolysed starch.

The moisture content of the starch-based abrasive affects apparent hardness and integrity of the material. The moisture content of starch-based abrasives is between about 5% and about 30%. In general, the more water that is present in the starch-based abrasive the greater the resiliency of the resulting material (with a lower apparent hardness), and the less aggressive grits based on such materials will be in, for example, removing a coating from a surface. On the other hand, the lower the moisture content the more generally brittle the material is likely to be, with a resultant loss of particle integrity and a greater rate of particle breakdown and hence higher grit costs to the user. Moreover, although moisture contents of less than 10% or even less than 5% are possible, the production of such products may result in thermal hydrolysis of the product, which is not generally desirable.

The hardness of the starch-based abrasive ranges between about 1.0 moh and about 4.0 moh. The hardness value of the glass-like polysaccharide of the present invention based on the moh scale of harness can be converted to equivalent values of other hardness scales used by those skilled in the art, such as the Brinnell scale, the Knoop scale, or the Vicker scale.

Starches in their native state have the form of granules of various sizes and shapes, and the amylaceous molecules that are bound in this granular structure must be dispersed in solution in the course of preparing starch-based abrasives. The process for carrying out this dispersion is well known in the starch industry as "gelatinization." In general, gelatinization entails heating an aqueous mixture of starch granules to a temperature at which the granules breakdown and the individual starch molecules disperse into solution. Typically, this is carried out in the course of producing the starch-based materials useful herein.

Materials useful herein are exemplified by those referenced in U.S. Pat. No. 3,706,598. Other similar starch-based abrasives are also known, and are useful for the purposes of the method of the present invention. These materials can be prepared by one skilled in the art without undue experimentation and development.

The recycled starch-based absorbent can be produced by a variety of approaches. These include, but are not limited to, (1) treatment of a solid surface by acceleration of a starch-based abrasive against it; (2) by modifying the form or finish of a solid surface using a starch-based abrasive; or (3) mechanically pulverizing the starch-based abrasive.

The recycled starch-based absorbent of the invention may be produced by treatment of any substance. One substance that can be treated comprises a metal. Examples of metals that can be treated by a starch-based abrasive, to produce a recycled starch-based absorbent, include, but are not limited to, steel, stainless steel, iron, nickel, nickel alloys, aluminum, aluminum alloys, scandium, copper, titanium, zinc, scandium, nickel, tungsten carbide, lead, gold, silver, platinum, beryllium, tin, brass, bronze and any other alloys or mixtures thereof. The metal surfaces may have been previously treated with coating agents such as paints and primers. The recycled starch-based absorbent may be produced by acceleration against a coating-treated metallic surface such that through the abrasive blasting, the paint surface is removed but the primer remains associated with the metal surface. The treatment of metallic surfaces by such a method is included for the purposes of illustration and is not considered to be limiting. Similar methods of treatment can be applied to any of the substances listed below.

Another substance that can be treated comprises a plastic. Examples of plastics that can be treated by the starch-based abrasive to produce a recycled starch-based absorbent include, but are not limited to, polypropylene, polystyrene, polyvinylchloride (PVC), acrylonitrile butadiene styrene (ABS), cellulose, acrylic, polyester, polycarbonate, acetyl, nylon, polyethylene, flouropolymers, polyphenylene oxide, polysulfone, polyetheretherketone (PEEK), polyetherimide, polyamide-amide, polyimide, PBI, fiberglass and garolite.

Yet another substance that can be treated comprises a composite material. Examples of composite materials that can be treated by a starch-based abrasive to produce a recycled starch-based absorbent include, but are not limited to, carbon fiber composites, kevlar fiber composites, boron fiber composites, and fiberglasses.

Another substance that can be treated comprises a rubber. Examples of rubbers that can be treated by a starch-based abrasive to produce a recycled starch-based absorbent include, but are not limited to, latex, pure gum rubber, nitrile, styrene-butadiene rubber, neoprene, epichlorohydrin, butyl, EPDM, hypalon, silicone rubber, polyurethane, santoprene, vinyl and viton.

Another substance that can be treated comprises a glass. Examples of glasses that can be treated by a starch-based abrasive to produce a recycled starch-based absorbent include, but are not limited to, borosilicate glass, silica glass, glass-ceramic, soda lime glass.

Yet another substance that can be treated comprises a ceramic. Examples of ceramics that can be treated by a starch-based abrasive to produce a recycled starch-based absorbent include, but are not limited to, glass-mica ceramic, alumina bisque ceramic, boron-nitride ceramic, garolite-laminated ceramic, high alumina ceramic, zirconia ceramic, zirconium phosphate ceramic, alumina ceramic, silica ceramic, zirconium oxide ceramic, and silicon-nitride.

A further substance that can be treated comprises a mineral. Examples of minerals that can be treated by the starch-based abrasive to produce a recycled starch-based absorbent include, but are not limited to, precious or semi-precious stone, such as diamonds, rubies, sapphires, emeralds, topazes, jade, amethyst, azurite, beryl, quartz, tourmaline, opal, and turquoise.

Another method of producing the recycled starch-based absorbent from a starch-based abrasive is by modifying the form or finish of a substance, such as one listed above. This modifying can be removing liquid from the surface, removing dirt or other residue from the surface, deburring, degrading, abrading, grinding, sanding, polishing, buffing, cleaning, degreasing, burnishing or other alterations of the surface. Modification can also include altering the shape of the substance being treated, for example, rounding off sharp edges.

Examples of methods to modify the form or finish of a substance include, but are not limited to, deburring, burnishing, polishing, cleaning, strengthening, preparing for anodization, preparing for painting, preparing for electroplating, or that the substance has improved oil or other liquid retention on its surface.

During the modification process, the substance is brought into contact with the starch-based abrasive media in an apparatus selected from, but not limited to, the group consisting of a vibratory mill, a ball mill, an agitator mill, an attrition mill, a roller ball mill, a bead mill, a planetary mill, and a sand mill, a vibratory finisher, a vibratory bowl finisher, a vibratory tub finisher, a centrifugal finisher, a centrifugal disc finisher, a centrifugal barrel finisher, a spindle finishing machine, a drag finishing machine, a tumbler, a barrel tumbler, a burnisher, and a racetrack finisher.

Vibratory finishing is a commonly used mass finishing technique. Vibratory finishing typically produces uniform finishes for the materials treated in the same lot. Parts are loaded into the vibratory finishing machine with a media or medias of choice, such as a starch-based abrasive. During the course of operation, the vibrating action from the apparatus causes the media to move against the substance being treated, resulting in the removal of liquids from the substance being treated, or modification of the form or finish of the substance being treated. This modification is largely dependent on the relative hardness of the treated substance as compared to the relative hardness of the media used. Time cycles for this finishing technique typically range from 1 to 24 hours; however, these times can be lengthened or shortened depending upon the desired end finish of the substance being treated. Following vibratory finishing, the starch-based abrasive, now having an average size of greater than 80 mesh is removed from the vibratory mill and can be used as an absorbent.

Barrel finishing is another commonly used mass finishing technique that utilizes a barrel rotating about its horizontal axis. The substances to be treated are loaded into the barrel along with a finishing media, such as a starch-based abrasive. The shape of the barrel can be varied to achieve differing effects on the substances being treated, with octagonal and hexagonal barrels being the most common shapes used. Amounts of media added to the barrel, and rotation speed, determine how the treatment modifies the substance being treated. Although vibratory finishers are more commonly used, barrel finishers tend to perform better on flat parts that need to be kept separated during the processing and mass finishing techniques. Time cycles for this finishing technique typically range from 1 to 24 hours; however, these times can be lengthened or shortened depending upon the desired end finish of the substance being treated. As before, following barrel finishing, the starch-based abrasive, now having an average size of greater than 80 mesh, is removed from the barrel mill and can be used as an absorbent.

A further method of producing the recycled starch-based absorbent is using a mill for pulverizing particulate material. For the purposes of illustration only, the pulverizing mill may comprise a housing having a particulate-material inlet, a particle outlet, and a particulate material pulverizing and classifying assembly for receiving the particulate material from the inlet. The pulverizing and classifying assembly pulverizes the particulate material into pulverized particles, and separates the pulverized particles by the size of the pulverized particles. The mill may also have a particle-removal conduit connected to the particle outlet and extending into the assembly for removal of the pulverized particles.

Although the particles and the precursor particles may have sizes varying over a wide range, specific particle size distributions and sizes are preferred. For purposes of the present invention, particle size is defined as the dimension of a particle or precursor particle that is reported in measurements of mesh. Thus, in one embodiment of the invention, the recycled absorbent has a mesh size greater than 100 mesh. In another embodiment of the invention, the recycled absorbent has an average mesh size greater that 80 mesh. In yet another embodiment, the recycled absorbent has an average mesh size greater than 120 mesh.

In an embodiment of the invention, contaminating metals are introduced into the starch-based absorbent during the recycling process. The contaminating metals include, but are not limited to: arsenic, selenium, zinc, copper, silver, nickel, titanium, lead, barium, chromium, beryllium, antimony, cadmium and mercury. The metals contaminating the recycled absorbent may be introduced during the treatment of surfaces to generate the recycled absorbent from the starch-based abrasive.

In one embodiment of the invention, the recycled starch-based absorbent, is mixed with a liquid producing a sludge. The liquid to be absorbed may be generated by a spill, through normal processes, or as a byproduct of normal processes. In a further embodiment of the invention, the recycled starch-based absorbent is used to absorb hazardous waste.

For purposes of illustration only and not to be limited by such examples, hazardous wastes may include: organic solvents, including alcohols, halogenated solvents, non-halogenated solvents, inorganic solvents, petroleum-containing liquids, paints, including wastewater generated in the production of pigments, stripping and cleaning bath solutions, diesel fuel, gasoline, and inks.

In another embodiment, the absorbent is poured around the perimeter of the spill to prevent spreading and consequent contamination of a larger area. Next, roller sponges, mops, squeegees, or brooms are moved back and forth through the liquid thereby allowing the absorbent to remove the liquid. Finally, all absorbent particles are collected and deposited in disposal containers using brooms and shovels. In yet another embodiment, the absorbent comprising the liquid is collected into disposal containers that meet transportation regulations.

Upon absorption of a liquid, the recycled absorbent is physically transformed from a solid, dust-like material to a sludge comprising the liquid. The sludge comprising the absorbent and hazardous waste may have a solid content. In one embodiment of the invention, the sludge has a solid content between about 0% to about 10%, between about 11% to about 20%, between about 21% to about 30%, between about 31% to about 40%, between about 41% to about 50%, between about 51% to about 60%, between about 61% to about 70%, or between about 71% to about 80%. In another embodiment, the sludge has a solid content between about 30% to about 60%.

It will be appreciated by those of ordinary skill in the art that the solid content of the composition is inversely proportional to the degree of weeping of the liquid from the solid, such that the greater the solid content of the sludge, the lesser the degree of weeping will occur. A benefit of the minimal degree of weeping, in some instances, may be that the absorbent captures and contains solvent fumes, thereby reducing the risk of fire.

In another embodiment of the invention, the composition comprising the recycled starch-based absorbent and liquid further comprises a settable compound. Settable compounds are useful for transport of the hazardous compositions because upon drying the settable compound provides rigidity to the hazardous composition. In one embodiment of the invention, the settable compound is cement, clay, calcium sulfate dihydrate, or calcium sulfate hemihydrate. In a further embodiment, the settable compound is cement.

Kits

The recycled starch-based absorbent of this invention can be provided in kit form together with instructions for use. In one embodiment of the invention, the absorbent is packaged in containers which range in size from 500 kg to 55 gallon (200 lb.) drums. In another embodiment, the recycled, starch-based absorbent is packaged in a 500-kg container. In a further embodiment, the absorbent is packaged in 55-gallon drum.

EXAMPLES

Example 1

Production of Starch-Based Abrasive

A mixture of 2 g dry basis unmodified corn starch, (10% water—Nacan—New Jersey), 0.02 g $CaCO_3$, 0.2 g of ground acrylic powder ground to a particle size smaller than 60 mesh, and 0.8 g water. The ingredients were thoroughly mixed and placed into an aluminum form 1.5 cm in diameter, 3 mm in thickness and having an aluminum lid. The form was placed into a 200° C. oil bath for 10 minutes. The form and its contents were subsequently quenched in a cold water bath. The resulting product was beige colored and plastic-like.

A Buss-Kneader with a 500 mm screw diameter and a processing barrel length of about 1 m was used. The processing barrel was equipped with 3 temperature zones (z1, z2 & z3). The processing screw was equipped with one temperature zone (z4), the crosshead and screw were equipped with one temperature zone (z5) and the die was equipped with one temperature zone (z6). The first zone was the feed zone adapted to receive the dry and liquid feeds of the various raw materials used in this example. The second zone was the mixing and heating zone incorporating mixing pins. The third and fourth zones contained conveying and/or compressing elements. The die contains 40 mm holes. A face cutter was used to cut the extrudate as it exited from the die plate. The extrudate was cut into pellets about 3 mm in length.

A blend of wheat starch (~90% dry basis by weight), acrylic powder ground to below 60 mesh (~10% basis by weight) and $CaCO_3$ (~0.5% basis by weight) was fed into the extruder along with water at a throughput rate of 300 lbs/hr. The screw speed was maintained at 70 rpm and the crosshead speed was maintained at 50 rpm. The temperature was controlled by maintaining each of the zones at the following temperatures as shown in Table 1.

TABLE 1

Extrusion Temperatures

| Zone | z1 | z2 | z3 | z4 | z5 | z6 |
|---|---|---|---|---|---|---|
| Temperature (° C.) | 20 | 90 | 110 | 90 | 110 | 110 |

These extrusion conditions resulted in a pearl colored, plastic-like product having a temperature at the die of 118° C. and a die pressure of 200 psi.

Example 2

Production of Recycled Starch-Based Absorbent

A study was performed to determine methods for the production of recycled starch-based absorbent. One recycled absorbent was produced from an experimental dry stripping media made from a corn hybrid polysaccharide blast media prepared in accordance with the teaching of U.S. Pat. No. 6,159,257. The media was entrained in a carrier (sponge) component prepared in accordance with the teaching of U.S. Pat. No. 5,256,703.

The polysaccharide blast media was previously shown to be effective in elastomeric sealant removal. The media was also shown to be effective in the removal of other elastomeric coatings such as found on certain radomes. The majority of the work performed used the following blast parameter:

Nozzle pressure: 48-52 psi
Media flow rate: 4-5 lbs./minute
Nozzle/surface distance: 3-6 inches The average diameter range of the media entrained in the sponge carrier was 3-6 mm. The consumption test was conducted in an experimental blast room. The following test specimens were blasted during each blast cycle using constant parameters.

C-130 radome section, paint removal
KC 135 aluminum skin section, structural sealant removal
Boeing 707 wing section, fuel tank sealant removal
2024 T3, aluminum test panel 0.032 inch thick, alclad (alclad profile after blast)

The blast parameters used for the consumption tests were:
Nozzle pressure: 50 psi
Nozzle/surface distance: 3-6 inches
Media flow rate: 3-5 lbs./minute
Nozzle type: 0.375 inch double venturi Each test specimen was blasted approximately 30 seconds during each cycle. The remaining time the media was projected against a 0.250 inch thick aluminum plate. After each blast cycle, the media was recovered from the floor and put into a Sweeco vibratory screening unit to remove the fine particles. The bottom screen on the unit was a #14 sieve (U.S. std.). To prevent any media from leaving the blast room during the blast operation, the ventilation system was not activated.

Example 3

Absorption Ability of Recycled Starch-Based Absorbent

The absorption ability of starch-based abrasive dust on a chemical/water waste mixture was evaluated using three different test methods: slump test, Brookfield viscosity and hydration capacity. Abrasive dust was prepared from EnviroStrip® abrasive grit using an approach similar to that put forth in Example 1. EnviroStrip® is a product group of glass-like polysaccharide abrasive grit, commercially available from Archer Daniels Midland Company of Decatur, Ill., that is used as media to treat various substrates, for example and without limitation, blasting or tumbling against a surface. The results using either corn or wheat-based recycled starch-based abrasive are shown in Table 2.

TABLE 2

Hydration Capacity, Slump Test & Brookfield Viscosity Results for Dust Testing

| Absorption by Weight | | |
|---|---|---|
| Waste Material | Corn | Wheat |
| Water | 2.23 | 5.91 |
| 30 W Motor Oil | 2.06 | 1.23 |
| Mineral Spirits | 0.91 | 0.83 |
| Acetone | 0.56 | 0.55 |
| Methylethylketone | 0.47 | 0.65 |
| Ethanol | 0.66 | 0.74 |
| Paint oil base | 2.4 | 3.3 |
| Paint water base | 7.21 | 10.33 |

| Absorption Data Wheat and Corn | | | |
|---|---|---|---|
| Sample | Slump (cm) | Liquid Separation (cm) | Viscosity (cps) |
| Corn | 2 | 0 | 40000 |
| Wheat | 0 | 0 | 280000 |

A slump test is done at 42% solids, adding recycled starch-based abrasive dust such as EnviroStrip to a chemical/water waste mixture. The chemical/water waste mixture is 25% water, 25% motor oil 30W, 25% paint (1:1 ratio of oil base: water base), and 25% solvent blend (1:1:1:1 ratio of alcohol: acetone:mineral spirits:methylethylketone). The slurry was stirred for 5 minutes and poured into a stainless steel tube (3.75 inches in height with 1.25 inches in diameter) standing upright on a horizontal glass tray. After a 20 second settling period, the tube is lifted vertically in one swift motion and the slurry is released and spreads out over the tray (slumps into the shape of a pancake or patty), the greater the diameter of the spread, the lesser the absorption ability of the dust. The slurry is left to dry and the diameter of the slump is measured. If the dust being tested is not effective in retaining the chemical/water mixture, liquid leaches out of the patty. The contribution of the leached liquid to the diameter of the patty is recorded separately.

A Brookfield viscosity test was also performed at room temperature on the same slurries that were tested for slump (42% solids) after 5 minutes of stirring. The viscosity is determined by measurement using a Brookfield viscometer. Therefore, high viscosities are an indication of the dust's greater absorption ability.

Hydration Capacities (Yamazaki, W. R. *Cereal Chem.* 30:2.2-2.6 (1953)) were done on each individual component of the chemical/water waste mixture. The hydration capacity results allow one to quantify the recycled starch-based abrasive dust's ability to absorb each component. Briefly, 2 g of the absorbent was placed into a 100 ml preweighed centrifuge tube. Forty ml of distilled water was added and the mixture was vigorously shaken. The suspension was allowed to stand for 10 minutes, during which time the tubes were inverted three times at the 5 and 10 minutes time points. The tubes were centrifuged for 15 minutes, the supernatant was decanted, and the tubes were weighed. The hydration capacity is calculated as:

$$H.C.=(wt.\ of\ tube+sediment)-(wt.\ of\ tube)-(wt.\ of\ sample(d.b.))/sample\ wt.(d.b.)$$

where (d.b.)=dry base

The starch dust's ability to absorb considerable water further strengthens the slump test results, since practically no liquid waste separated out of the slump patties, indicating that the starch most probably absorbs almost completely the water based liquid waste fraction. Furthermore, the starch dust is most likely contributing to the organic liquid absorption by trapping the solvent in its matrix as well.

The foregoing specification, including the specific embodiments and examples, is intended to be illustrative of the invention and is not to be taken as limiting. Numerous other variations and modifications can be effected without departing from the true spirit and scope of the invention. All publications, patents and patent applications cited herein are incorporated by reference in their entirety into the disclosure.

We claim:

1. A method of absorbing a liquid comprising:
providing a gelatinized recycled starch-based absorbent comprising a plurality of solid granules and having an average amylose content of at least 45% by weight from an abrasive process; and
mixing the gelatinized recycled starch-based absorbent having an average size greater than 80 mesh with the liquid to form a composition;
wherein the liquid is a petroleum-containing liquid;
wherein the mixing results in absorbing of the liquid such that minimal weeping occurs.

2. The method of claim 1, wherein the weeping of the from the absorbent is 10% or less.

3. The method of claim 1, wherein the composition has a solid content selected from the group consisting of between: about 0% to about 10% by weight; about 11% to about 20% by weight; about 21% to about 30% by weight; about 31% to about 40% by weight; about 41% to about 50% by weight; about 51% to about 60% by weight; about 61% to about 70% by weight; and about 71% to about 80% by weight.

4. The method of claim 3, wherein the solid content is between about 30% to about 60% by weight.

5. The method of claim 1, wherein the gelatinized recycled starch-based absorbent is produced from a starch-based material selected from the group consisting of wheat, corn, potato, tapioca, and rice.

6. The method of claim 5, wherein the starch-based material is a copolymer.

7. The method of claim 1, wherein the gelatinized recycled starch-based absorbent is produced by propelling a starch-based blasting media against a solid surface.

8. The method of claim 1, wherein the gelatinized recycled starch-based absorbent further comprises contaminating metals.

9. The method of claim 8, wherein the contaminating metals are selected from the group consisting of: arsenic, selenium, zinc, copper, silver, nickel, titanium, lead, barium, chromium, beryllium, antimony, cadmium and mercury.

10. The method of claim 1, wherein the composition further comprises a settable compound.

11. The method of claim 10, wherein the settable compound is cement.

12. The method of claim 1, further comprising collecting the composition.

13. The method of claim 12, wherein the composition is collected into disposal containers.

14. A method of absorbing a liquid comprising:
mixing starch and an acrylic powder, extruding the starch and the acrylic powder, and forming the extruded starch and acrylic powder into a gelatinized absorbent, solid granule having an average size greater than 80 mesh;
accelerating the gelatinized absorbent, solid granule against a solid surface;
collecting the gelatinized absorbent, solid granule that has been accelerated against the solid surface; and
mixing the gelatinized absorbent, solid granule with the liquid to form a composition, wherein the liquid is selected from the group consisting of a petroleum-containing liquid, diesel fuel, gasoline, or combinations of any thereof;
wherein the mixing results in absorbing of the liquid such that minimal weeping occurs.

15. The method of claim 14, wherein the weeping of the liquid from the absorbent is 10% or less.

16. The method of claim 14, wherein the gelatinized absorbent, solid granule is produced by propelling a plurality of the gelatinized absorbent, solid granules against a solid surface.

17. The method of claim 14, the solid surface is selected from a group consisting of a metal, a plastic, a composite material, a rubber, a glass, a ceramic and a mineral.

18. The method of claim 14, wherein the gelatinized, absorbent solid granule further comprises calcium carbonate.

* * * * *